Patented Sept. 13, 1932

1,876,884

UNITED STATES PATENT OFFICE

HEINZ EICHWEDE AND JOSEF RACHOR, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

YELLOW PYRAZOLONE MONO AZO DYESTUFFS

No Drawing. Application filed September 12, 1929, Serial No. 392,250, and in Germany September 21, 1928.

Our present invention relates to yellow pyrazolone mono azo dyestuffs.

In U. S. Patent Specification No. 965,882 a process of preparing yellow wool dyestuffs is described which consists in causing the diazo compounds of aminoaryl-sulfonamides, wherein the sulfur of the sulfonamide-residue is attached to a carbon atom of the aryl residue, for instance, of a benzene or naphthalene nucleus, respectively, containing the amino group, and derivatives thereof to act upon pyrazolones or their substitution products and, if desired, sulfonating the dyestuffs thus obtained.

Now we have found that dyestuffs are obtained which in comparison with those described in the above mentioned U. S. patent specification have an increased fastness to light, when coupling diazo compounds of bases having the following general formula:

$$NH_2-aryl-SO_2-NH-aryl$$

wherein the aryl nuclei may be substituted by alkyl, alkoxy or halogen, with aryl-pyrazolones or substitution products thereof which are substituted in the aryl nucleus by halogen, and, if necessary, sulfonating the dyestuffs thus obtained. The fact that by introducing halogen atoms the fastness to light of the above named dyestuffs would be increased was unknown. In U. S. Patent Specification No. 965,882 halogenated arylpyrazolones are not mentioned.

The dyestuffs obtainable according to the present invention are characterized by the following probable general formula:

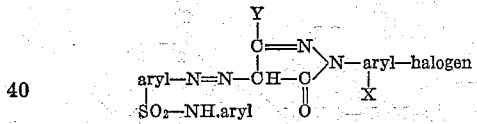

wherein aryl represents an aryl residue the hydrogen atoms of which may be substituted by alkyl, alkoxy or halogen, Y stands for the groups $CH_3$-, COO-alkyl- or a carboxyl group and X for a sulfo group, more particularly by the following probable formula:

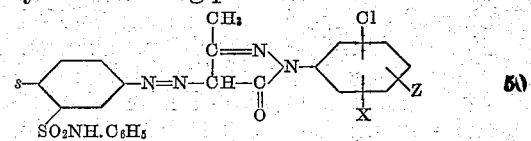

wherein Z stands for a $CH_3$-group, a chlorine- or hydrogen atom, s for a $CH_3$-group or hydrogen and X for a sulfo group.

The following examples serve to illustrate our invention but they are not intended to limit it thereto, the parts being by weight:

(1) 26.2 parts of 1-methyl-4-aminobenzene-2-sulfonic acid-phenylamide are diazotized with 48 parts of hydrochloric acid of 20° Bé. and 6.9 parts of sodium nitrite and coupled with 31 parts of the sodium salt of 1-(2'-chloro-4'-sulfophenyl)-3-methyl-5-pyrazolone in the presence of an excess of sodium carbonate. The dyestuff thus formed is precipitated by means of sodium chloride and filtered; it represents when being dried a yellow powder and dyes wool greenish-yellow tints of very good fastness to light. By using instead of the pyrazolone mentioned in this example the 1-(4'-chloro-5'-methyl-2'-sulfophenyl)-3-methyl-5-pyrazolone or the 1-(2'-chloro-5'-sulfophenyl)-3-methyl-5-pyrazolone, a dyestuff dyeing similar tints and having similar fastness properties is obtained.

(2) 24.8 parts of meta-aminobenzene-sulfonic acid-phenylamide are diazotized as indicated in Example 1 and coupled with 31 parts of the sodium salt of the 1-(2'-chloro-5'-sulfophenyl)-3-methyl-5-pyrazolone in the presence of an excess of sodium carbonate. The dyestuff thus obtained is precipitated by means of the sodium chloride, filtered and represents when being dried a yellow powder. It dyes wool greenish-yellow tints of very good fastness to light.

When using instead of the pyrazolone mentioned in this example other pyrazolones such, for instance, as those mentioned in Example 1, there are likewise obtained dyestuffs dyeing wool greenish-yellow tints and having an excellent fastness to light.

(3) 24.8 parts of meta-aminobenzene-sulfonic acid-phenylamide are diazotized as indicated in Example 1 and coupled with 33 parts of the sodium salt of the 1-(2'.5'-dichloro-4'-sulfophenyl)-3-methyl-5-pyrazolone in the presence of an excess of sodium carbonate. The dyestuff thus obtained is precipitated by means of sodium chloride and represents when being dried a yellow powder. It dyes wool greenish-yellow tints of very good fastness to light.

The following bases: meta-aminobenzene-sulfonic acid-phenylamide, 1-methyl-4-aminobenzene-2-sulfonic acid-phenylamide, 1-methyl-4-aminobenzene-2-sulfonic acir-ortho-tolylamide, and many other bases can be combined in any manner with the following pyrazolones: 1-(2'-chloro-5'-sulfophenyl)-3-methyl-5-pyrazolone, 1-(2'-chloro-4'-sulfophenyl)-3-methyl-5-pyrazolone, 1-(4'-chloro-2'-sulfophenyl)-3-methyl-5-pyrazolone, 1-4'-chloro-5'-methyl-2'-sulfophenyl)-3-methyl-5-pyrazolone, 1-(2'.5'-dichloro-4'-sulfophenyl)-3-methyl-5-pyrazolone, 1-(4'-chloro-3'-sulfophenyl)-5-pyrazolone-3-carboxylic acid, 1-(2'-chloro-5'-sulfophenyl)-5-pyrazolone-3-carboxylic acid ester etc. to dyestuffs of the above mentioned kind.

The present invention, however, is not limited to the preparation of dyestuffs obtainable from the above mentioned substances.

We claim:

1. As new products, the azo dyestuffs of the following probable general formula:

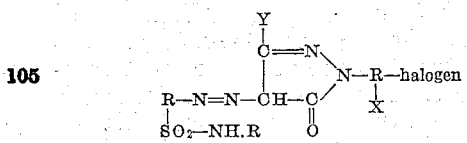

wherein R stands for a benzene residue which may be substituted by alkyl or halogen,
Y for a CH$_3$-, COO-alkyl- or a carboxyl group and
X for a sulfo group,
the said dyestuffs having a yellow color and being distinguished by their fastness to light.

2. As new products, the azo dyestuffs of the following probable general formula:

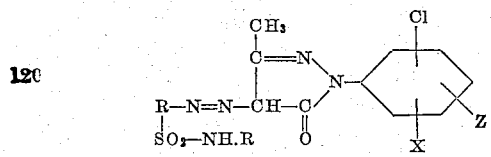

R stands for a benzene residue which may be substituted by alkyl,
Z for CH$_3$-group, a chlorine- or hydrogen atom and
X for a sulfo group,
the said dyestuffs having a yellow color and being distinguished by their fastness to light.

3. As new products, the azo dyestuffs of the following probable general formula:

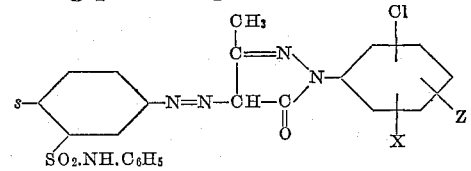

wherein Z stands for a CH$_3$-group, a chlorine or a hydrogen atom,
X for a sulfo group and
s for a CH$_3$-group or hydrogen,
the said dyestuffs having a yellow color and being distinguished by their fastness to light.

4. As new products, the azo dyestuffs of the following probable general formula:

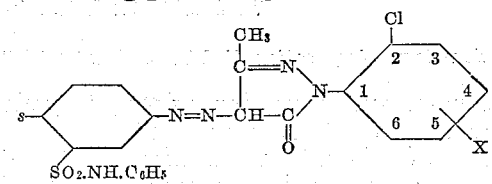

wherein X stands for a sulfo group in 4- or 5-position and
s for a CH$_3$-group or hydrogen,
the said dyestuffs having a yellow color and being distinguished by their fastness to light.

5. As new products, the azo dyestuffs of the following probable general formula:

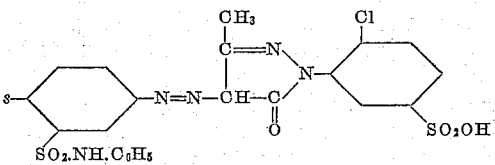

wherein s stands for a CH$_3$-group or hydrogen, the said dyestuffs having a yellow color and being distinguished by their fastness to light.

6. As new products, the azo dyestuffs of the following probable general formula:

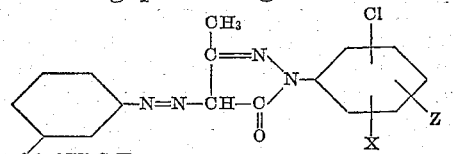

wherein Z stands for a CH$_3$-group, a chlorine or hydrogen attom. X for a sulfo group, the said dyestuffs having a yellow color and being distinguished by their fastness to light.

7. As new products, the azo dyestuffs of the following probable general formula:

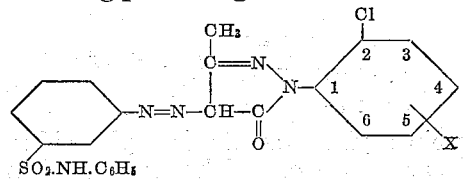

wherein X stands for a sulfo group in 4- or 5-position, the said dyestuffs having a yellow color and being distinguished by their fastness to light.
8. As a new product, the azo dyestuff of the following probable formula:
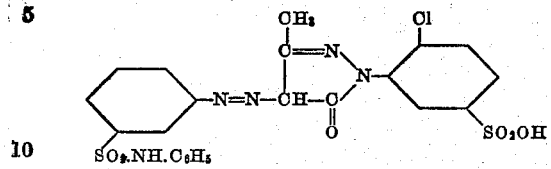
the said dyestuff having a yellow color and being distinguished by its fastness to light.
In testimony whereof, we affix our signatures.
HEINZ EICHWEDE.
JOSEF RACHOR.